Nov. 19, 1940.  W. D. MOUNCE ET AL  2,221,951
MAKING ELECTRICAL MEASUREMENTS
Filed Dec. 24, 1937
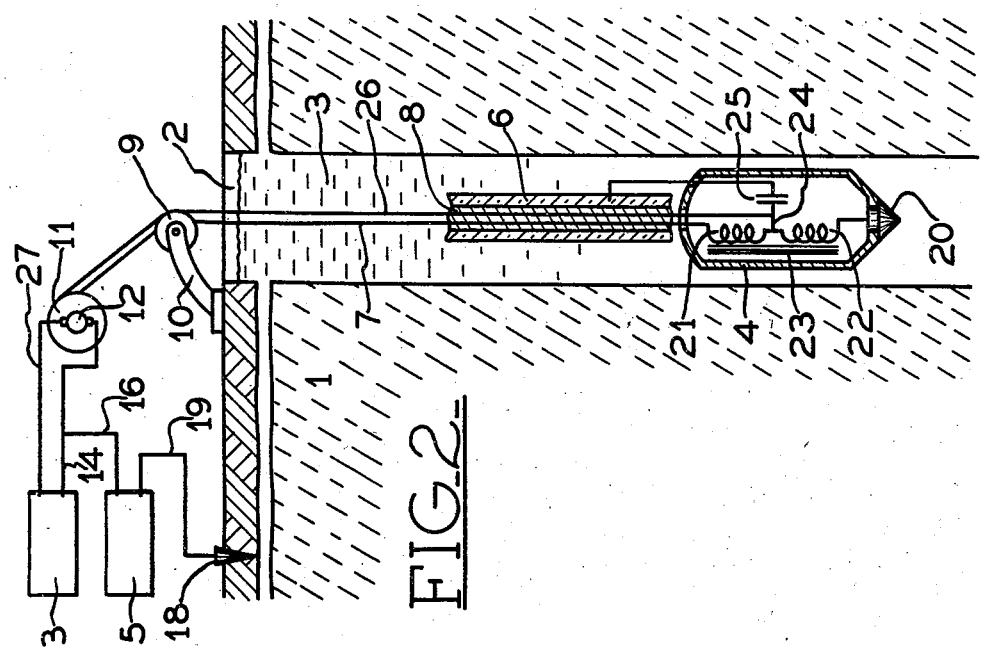
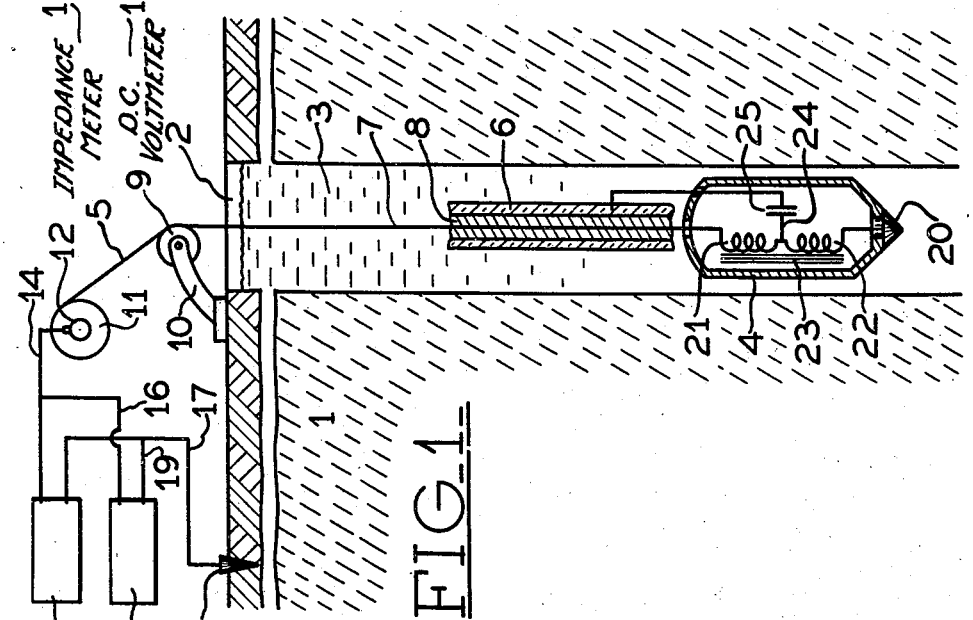
Whitman D. Mounce
William M. Rust Jr. INVENTOR.
BY
P. L. Young ATTORNEY.

Patented Nov. 19, 1940

2,221,951

UNITED STATES PATENT OFFICE 2,221,951

MAKING ELECTRICAL MEASUREMENTS

Whitman D. Mounce and William M. Rust, Jr., Houston, Tex., assignors to Standard Oil Development Company, a corporation of Delaware Application December 24, 1937, Serial No. 181,621

10 Claims. (Cl. 175—182)

The present invention is directed to apparatus for making electrical measurements with a pair of electrodes, one of which is attached to a cable carrying a conductor wound on a drum, which is wound and unwound during the use of the electrodes. The present invention is particularly applicable to electrical well-logging in which a pair of electrodes are employed, one of which is placed at the surface and the other of which is lowered and raised in a borehole at the end of a cable carrying a conductor, part of which is wound on a drum at the surface.

In making electrical measurements in the manner indicated above, especially in making alternating current impedance measurements, an error is introduced into the measurements by reason of the changes in inductive reactance and alternating current resistance in the conductor connected to the electrode at the end of the cable as the cable is unwound and rewound on the drum. This error is of particular significance in electrical well-logging by the impedance method in which a single-conductor cable is employed. In this method an electrode having an exposed conductive element is lowered into a borehole at the end of a cable which is wound on a drum at the surface. A conductor carried inside the cable connects the conductive element of the electrode with an impedance meter, which includes a source of alternating current power, through a slip ring arrangement provided on the drum. The other side of the impedance meter is connected to an electrode which is embedded in the ground at the surface.

The borehole in which this logging method is usually employed may range from 5000 ft. to 12,000 ft. in depth. In most cases the borehole electrode is carried by about 10,000 ft. of cable. The inductance of 10,000 ft. of cable wound on a drum of reasonable dimensions is several tenths of a henry. The maximum variation of earth impedance which is normally encountered is 3 to 4 ohms. Generally these variations are only a fractional part of the specified values. Even at 60 cycles, $\frac{1}{10}$ of a henry is approximately 40 ohms and increases with the frequency. In addition, there is an added alternating current resistance of comparable value when the cable is wound on a metal drum. This resistance goes up very rapidly with the frequency. For ordinary speeds of operation the frequency employed must be considerably in excess of 60 cycles.

Thus when the borehole electrode cable is wound on the drum its inductive reactance and added alternating current resistance will be very high. Both of these values, however, decrease if the cable is unwound, being almost zero when the cable is entirely in the borehole. Consequently, the winding and unwinding of the cable cause a change of impedance many times as great as the change in earth impedance to be measured and introduce a substantial error into the measurements.

According to the present invention, the above difficulty is overcome by connecting the conductor in the cable to the conductive portion of the electrode used for measuring impedance through a transformer, the conductor being connected to the primary and the impedance measuring element being connected to the secondary, the impedance of the secondary being made low, preferably not more than a small multiple of the average earth impedance normally encountered and the impedance of the primary being made high, preferably a large multiple of the changes in impedance in the circuit due to the winding and unwinding of the cable on the drum. An ideal condition is to have the impedance of the secondary substantially equal to the average earth impedance which may be expected and to have the impedance of the primary approximately equal to the impedance of the impedance measuring circuit, which impedance should be large compared to that of the cable when it is wound on the drum. In this way changes in earth impedance are magnified and changes in cable impedance due to winding and unwinding are minimized. A practical upper limit is set on the impedance of the primary by the fact that, if it be made too large, the current carried by the cable will tend to leak out into the fluid in the borehole.

The arrangement just described is also advantageous when a two-conductor cable is employed, in which case the changes in inductive reactance of the cable above referred to are eliminated by the mutually neutralizing effect of the inductances due to the two conductors. Even when this inductive reactance is eliminated, the sensitivity of the measuring circuit is limited by the fact that the changes in earth impedance are so small compared to the impedances of the measuring circuit itself. With the arrangement of the present invention, as previously pointed out, the earth impedance changes are magnified with respect to the impedance of the measuring circuit.

Further advantages of the present invention will appear from the following detailed description of the accompanying drawing in which:

Figure 1 is a schematic view of the arrangement according to the present invention applied to a single conductor cable; and Figure 2 is a similar view of the arrangement applied to a two conductor cable.

Referring to Figure 1 in detail, the earth composed of different strata is designated by numeral 1. A vertical borehole 2 is shown filled with a drilling fluid 3. An electrode 4, composed of Bakelite" or other insulating material is suspended in the borehole at the end of a cable 5 having an outer sheath of metal 6 and a centrally located conductor 7 separated from the metal sheath by insulating material 8. The cable is trained on a roller 9 mounted on a stand 10 adjacent the borehole and is wound on a drum 11 provided with a slip-ring arrangement 12, to which the conductor 7 is connected in a known manner. Slip-ring 12 is connected to one terminal of an impedance meter 13 by conductor 14 and to a D. C. voltmeter or potentiometer 15 by a conductor 16. The impedance meter may be any common type, such as that disclosed in U. S. Patent #2,037,306, issued April 14, 1936, to Blau and Gemmer, or any of the arrangements described and claimed in our copending application Ser. No. 160,213. The other side of the impedance meter is connected through conductor 17 to a second electrode 18 which is embedded in the ground. The other side of voltmeter 15 is connected to conductor 17 by conductor 19.

A metallic tip 20 is fixed at the lower end of electrode 4. Inside the electrode the conductor 7 is coiled to make a primary winding 21 and a secondary winding 22 and is connected to tip 20. A laminated soft iron core 23 is arranged so as to conduct magnetic lines of force from coil 21 to coil 22. The junction of the primary and secondary is connected by a conductor 24 through condenser 25 to the sheath 6 of the cable.

In operation, an alternating current, developed by an oscillating circuit supplied by a source in the impedance meter, flows through conductor 7 through the primary 21, through conductor 24 and condenser 25 to sheath 6. In practice this current will leak out of sheath 6 into the surrounding fluid and earth, and is thus grounded. The lines of force set up in core 23 cut the turns of secondary 22 and induce therein an alternating E. M. F. which causes current to flow out of tip 20 through the earth to sheath 6 and thus back to the junction point of primary and secondary. The current leaving tip 20 also flows through the earth to electrode 18.

The ratio of the turns in primary 21 to the turns in secondary 22 is very high. If it be assumed that this ratio is R, the change in impedance in the primary for a given change, Z, in the earth impedance will be $R^2Z$. Thus it can be seen that by this arrangement changes in earth impedance are magnified by the square of the ratio between the primary and the secondary. Thus, by making R sufficiently large, the changes in the impedance of the primary corresponding to changes of earth impedance, may be made large compared to the changes of impedance in the primary circuit due to cable 5 being wound on and unwound from drum 11.

In addition to the minimizing of the effect of changes in inductive reactance of the cable, two other advantages accrue from the above described arrangement. First, the change in contact resistance of the slip ring arrangement on the drum is less important, by the factor $$\frac{1}{R^2}$$

than it is in direct measurements. Second, the ratio of the change in impedance to the total impedance in the measuring circuit is increased, since in the direct method the resistance of cable 5 is large compared to the changes in earth impedance, whereas, in the above arrangement, the resistance of the secondary 22 is usually less than the changes in earth impedance.

The placing of condenser 25 in line 24 is for the purpose of making possible the simultaneous measurement of the natural earth potential. This condenser does not interfere with the impedance measurements because it offers a low impedance to the alternating current used for these measurements. The condenser eliminates the possibility of any flow of direct current from tip 20 to sheath 6 due to any difference in their natural earth potential, and, thereby, makes the natural earth potential a true measurement of the natural potential difference between a point in the borehole opposite tip 20 and the surface. In cases where it is not desired to measure natural earth potential or where provision is made for the separate measurement of natural earth potential, condenser 25 can be omitted, the primary of the transformer being connected to conductor 7 and the sheath 6, and the secondary being connected to tip 20 and the sheath 6.

It is to be noted that the conducting surface 6, or the sheath, has a surface area which is very large compared to the surface area of tip 20. This relation is essential to the accurate measurement of the earth impedance at a point opposite the tip 20. With this relation the resistance of the conducting surface 6 and the earth area opposite it is so small in comparison to the surface area of the tip 20 and the earth area opposite it, that any changes in the impedance of the circuit, including tip 20, the earth and conducting surface 6, may be assumed to be wholly due to changes in earth impedance in the earth area opposite tip 20.

While the sheath 6 of the cable has been illustrated as part of the secondary circuit, it is apparent that a separate electrode can be arranged around the cable above the main electrode, if desired, or can be suspended below the main electrode. The only requirement is that this second electrode shall have a surface area large in comparison to the surface area of tip 20.

In Figure 2 is shown the arrangement of parts when a two-conductor cable is employed. In this case parts corresponding to those shown in Figure 1 bear the same numerals. The difference between this arrangement and that shown in Figure 1 is that a second conductor 26 is included in the cable and a corresponding return conductor 27 is arranged between slip ring 12 and the impedance meter 13. In this case the alternating current instead of having to return through the ground, returns through conductor 26 which is connected to conductor 24. As in the arrangement shown in Figure 1, the induced E. M. F. in secondary 22 causes a current to flow from tip 20 through the earth to sheath 6 and back through conductor 24 and condenser 25 to the secondary.

In the drawing the sheath of the cable is shown disproportionately large for sake of clarity. It is to be understood that the cable is the same thickness throughout although the upper end of the cable in the drawing is designated by a single line.

Various changes can be made in the arrangement shown without departing from the basic principle thereof or the scope of the present invention. Such changes are contemplated within the purview of the appended claims in which it is intended to claim the present invention as broadly as the prior art permits.

We claim:

1. In an apparatus for logging a well, in combination, a pair of spaced electrically conductive exposed surfaces adapted to be moved up and down the well, means for causing an alternating current to flow through the earth between said surfaces, a measuring circuit for indicating the impedance of the earth between said surfaces and means for matching the impedance of the earth between said surfaces to the impedance of the measuring circuit.

2. An apparatus, according to the preceding claim, in which the ratio of the surface area of one exposed surface to the surface area of the other is large.

3. An apparatus, according to claim 1, in which the exposed surfaces are connected by a conductor which is inductively connected to the measuring circuit.

4. An apparatus for logging a well comprising a casing member adapted to be moved up and down the well and carried by a conductor cable, which during the operation, is wound and unwound on a drum, a source of alternating current, an exposed electrically conductive tip on said casing member, a second exposed electrically conductive surface spaced from said tip, an electrical connection between the tip and said exposed surface including the secondary of a transformer and a condenser arranged between said secondary and said exposed surface, a conductor connecting said source of power to the primary of the aforesaid transformer, an impedance meter connected in the circuit of said source of alternating current, an electrode connected to said impedance meter and adapted to be imbedded in the ground at the surface and a D. C. voltmeter having one terminal electrically connected to said electrode and the other terminal electrically connected to said conductive tip.

5. An apparatus, according to the preceding claim, in which the second exposed electrically conductive surface is a metallic armor on the cable carrying the electrode.

6. An apparatus, according to claim 4, in which the impedance of the secondary of the transformer is comparable to the average impedance encountered in traveling through substrata and the impedance of the primary of the transformer is comparable to the impedance of the remainder of the circuit of which it is a part.

7. In an apparatus for logging a well, in combination, a pair of spaced electrically conductive exposed surfaces adapted to be moved up and down the well, a first winding of a transformer directly connected to one of said exposed surfaces, a circuit in direct electrical connection with said first transformer winding including the other winding of said transformer, a ground electrode, an alternating current meter, a direct current meter, and a source of alternating current and an electrical connection for alternating current only connecting said first winding of the transformer with the other exposed surface.

8. An apparatus according to the preceding claim in which the electrical connection between said first winding of the transformer with the other exposed surface includes a condenser.

9. An apparatus according to claim 7 in which the ratio of the second winding of the transformer to the first winding is large.

10. An apparatus according to claim 7 in which the first winding of the transformer has an impedance comparable to the average impedance encountered in traveling through earth substrata and the second winding of the transformer has an impedance comparable to that of the remainder of the measuring circuit.

WHITMAN D. MOUNCE.
WILLIAM M. RUST, Jr.